(12) United States Patent
Ohara et al.

(10) Patent No.: US 10,878,055 B2
(45) Date of Patent: Dec. 29, 2020

(54) WEB SERVER

(71) Applicant: BROTHER KOGYO KABUSHIKI KAISHA, Nagoya (JP)

(72) Inventors: Kiyotaka Ohara, Nagoya (JP); Tatsuhiro Ikedo, Ena (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 119 days.

(21) Appl. No.: 15/796,934

(22) Filed: Oct. 30, 2017

(65) Prior Publication Data
US 2018/0285467 A1 Oct. 4, 2018

(30) Foreign Application Priority Data
Mar. 31, 2017 (JP) .................... 2017-071975

(51) Int. Cl.
G06F 16/955 (2019.01)
G06F 16/958 (2019.01)
H04L 29/08 (2006.01)
G06F 3/12 (2006.01)

(52) U.S. Cl.
CPC ........ *G06F 16/9566* (2019.01); *G06F 3/1203* (2013.01); *G06F 3/1273* (2013.01); *G06F 3/1285* (2013.01); *G06F 16/986* (2019.01); *H04L 67/02* (2013.01); *H04L 67/22* (2013.01)

(58) Field of Classification Search
None
See application file for complete search history.

(56) References Cited

U.S. PATENT DOCUMENTS

| 2003/0014368 | A1 | 1/2003 | Leurig et al. |
| 2003/0023703 | A1 | 1/2003 | Hayward et al. |
| 2003/0110412 | A1 | 6/2003 | Neville |
| 2003/0187922 | A1* | 10/2003 | Ohara ............... H04L 67/06 709/203 |
| 2008/0244000 | A1* | 10/2008 | Nakamura ......... H04L 67/025 709/203 |

FOREIGN PATENT DOCUMENTS

JP 2001-344196 A 12/2001

OTHER PUBLICATIONS

Extended European Search Report dated Jan. 30, 2018 from related European Application No. 17200428.5, 8 pages.
Communication dated Feb. 24, 2020 received in European Patent Application No. EP 17 200 428.5.

* cited by examiner

*Primary Examiner* — Hau H Hoang
*Assistant Examiner* — Hau Hoang
(74) *Attorney, Agent, or Firm* — Scully Scott Murphy and Presser

(57) ABSTRACT

A communication system comprising: a first controller configured to perform: receiving, from a terminal device, target-related information relating to a target peripheral device; transmitting the specific data to the terminal device; receiving, from the terminal device, a first page request; transmitting a first web page data to the terminal device; and executing a specific process for storing a first URL included in the first page request and the target-related information related to the target peripheral device in association with each other in a first memory.

21 Claims, 8 Drawing Sheets

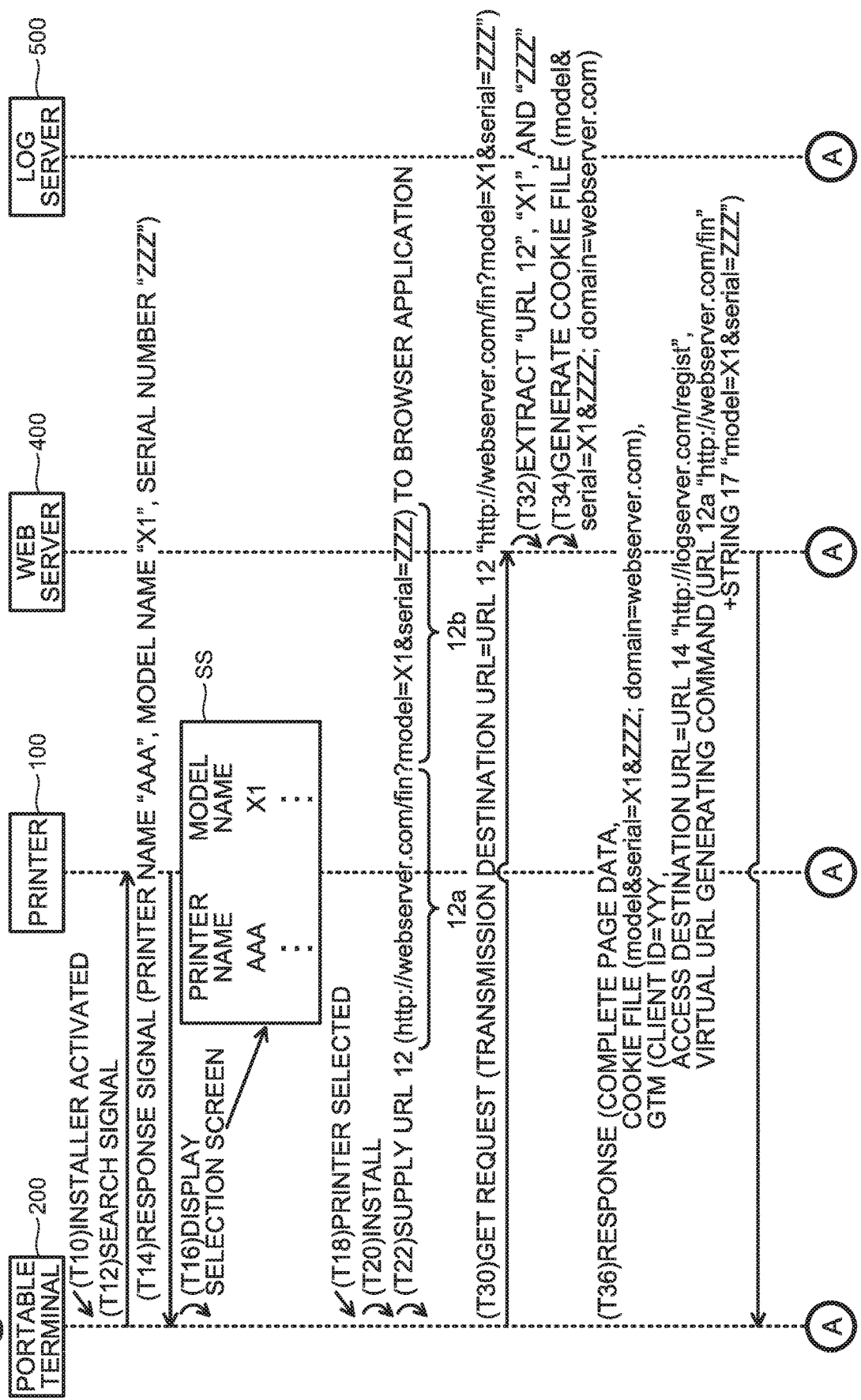

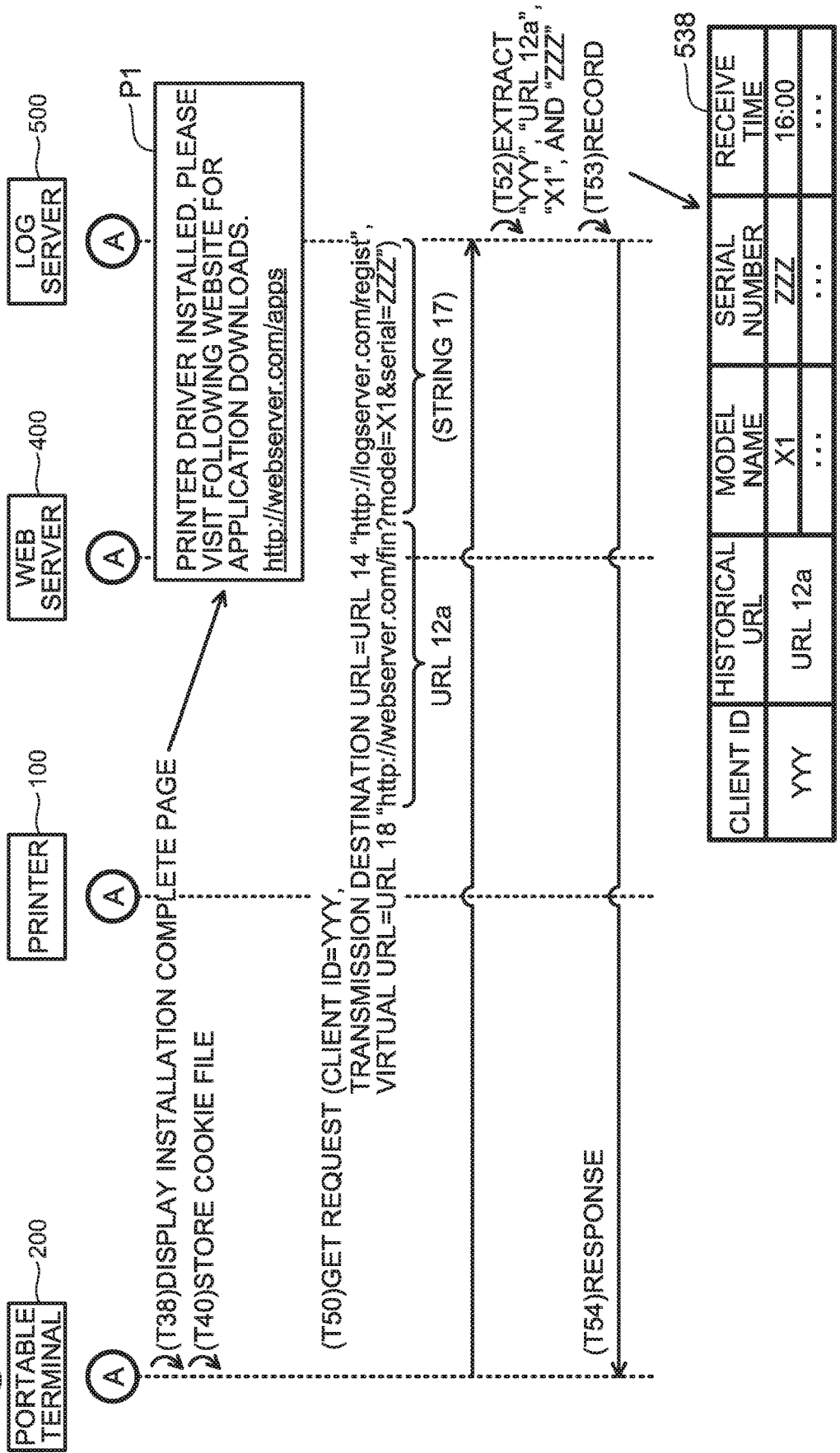

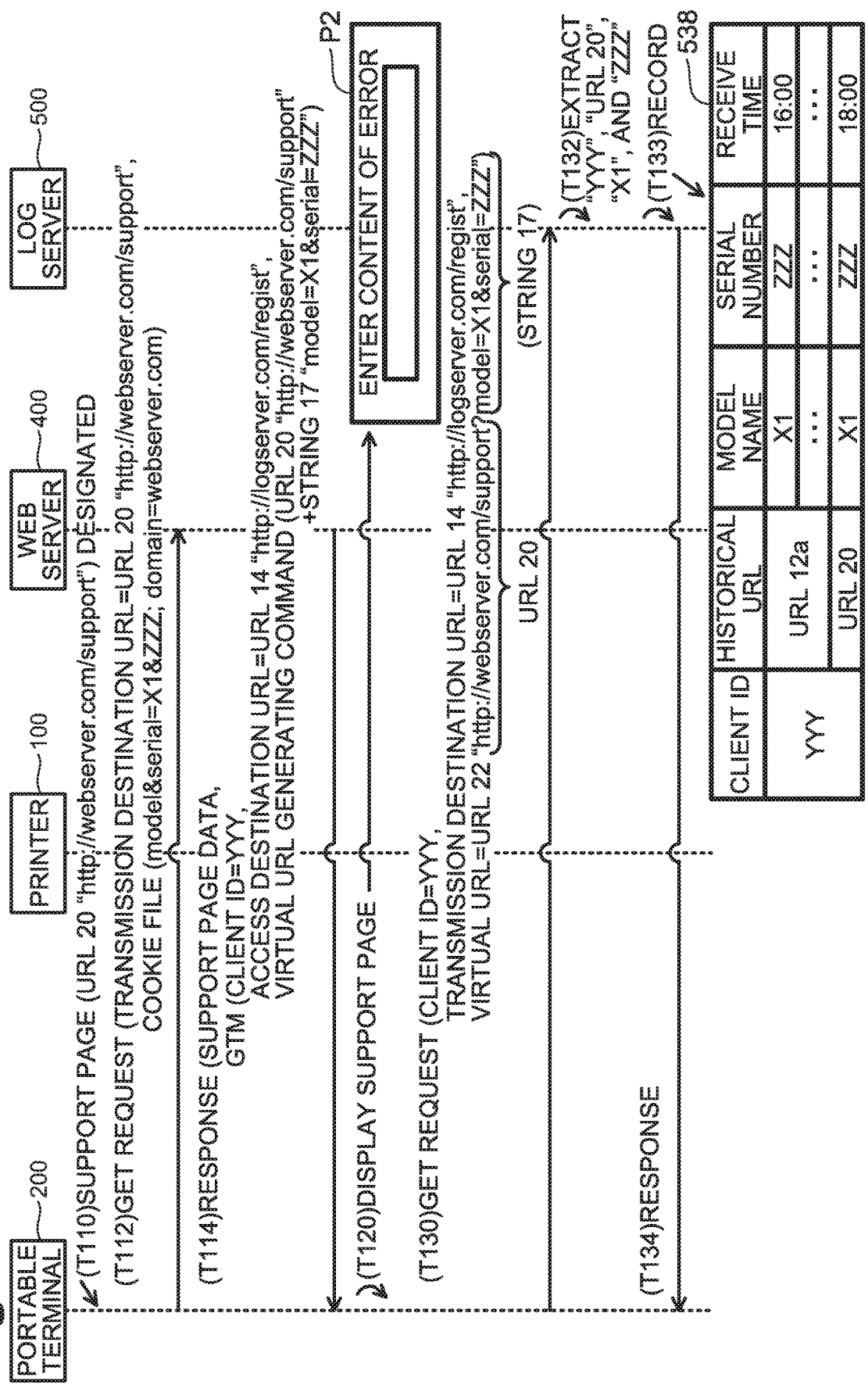

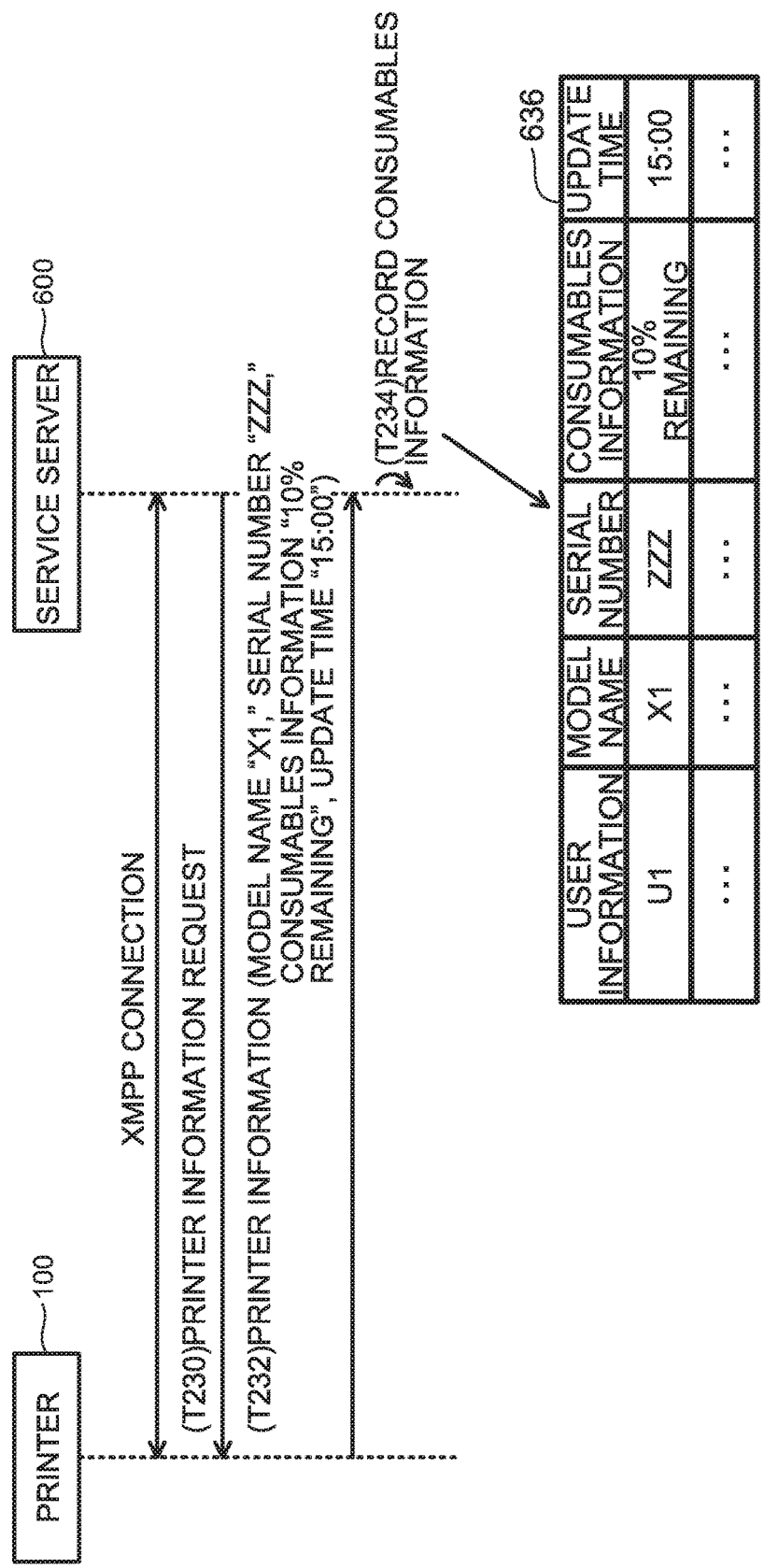

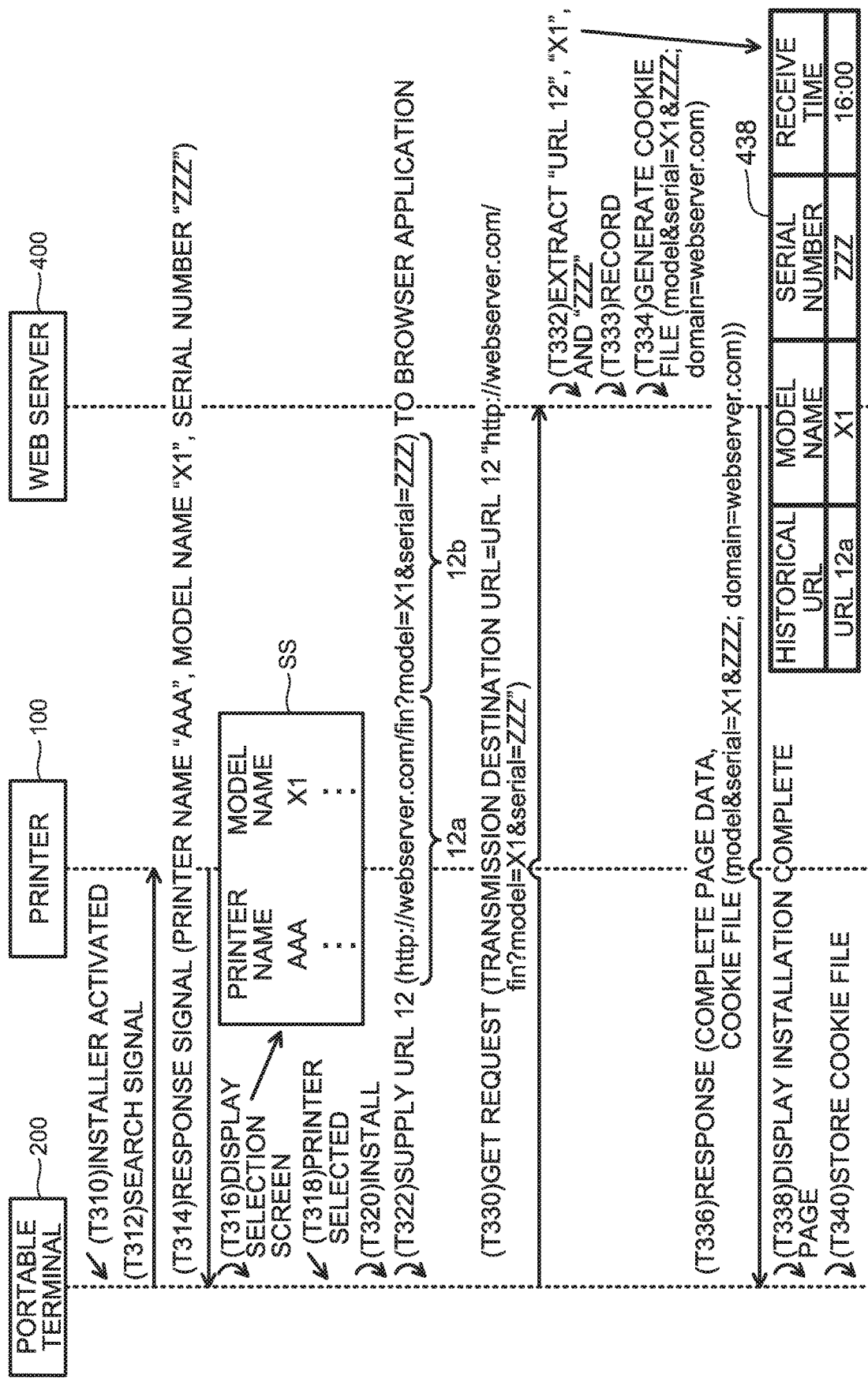

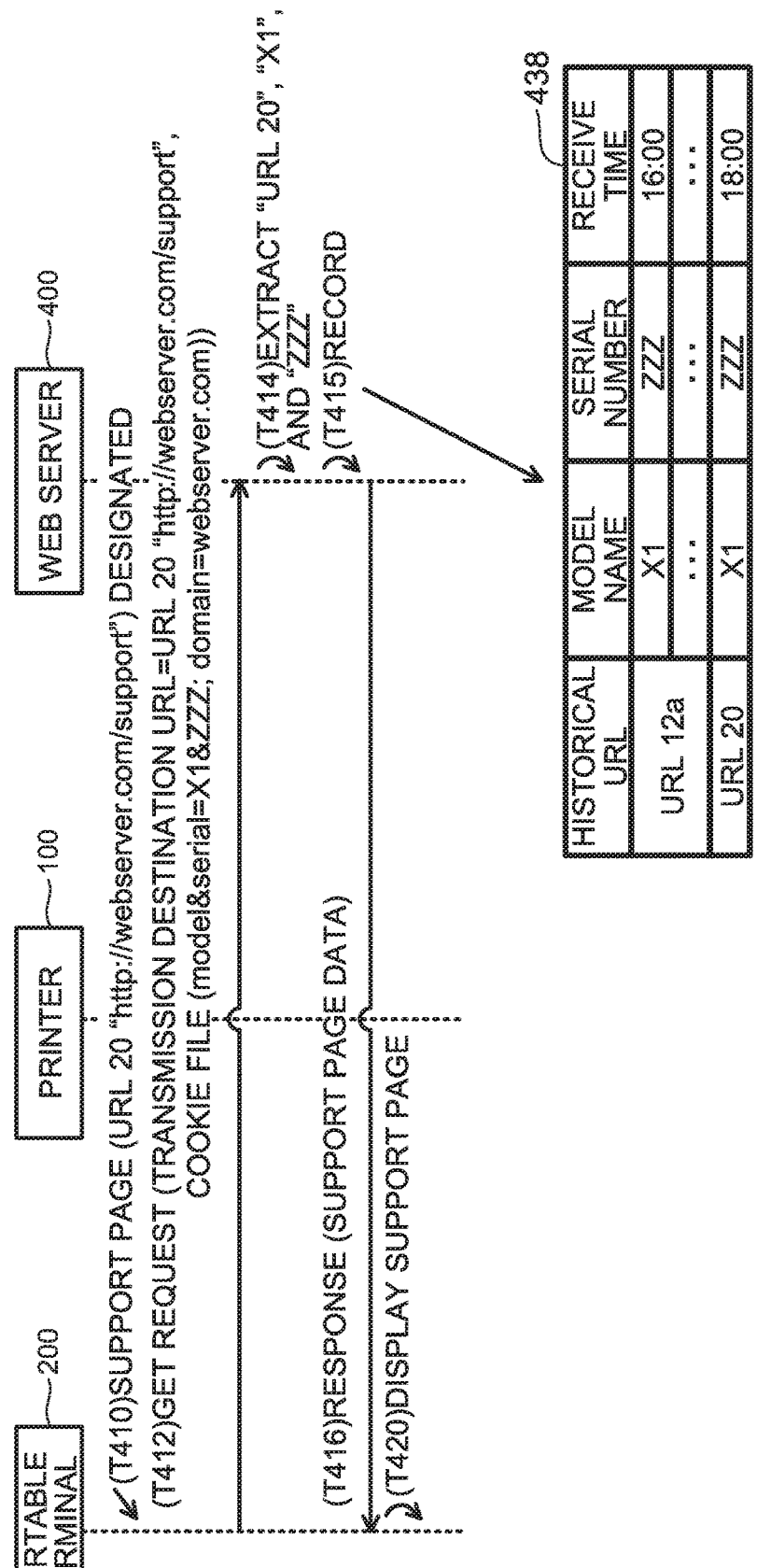

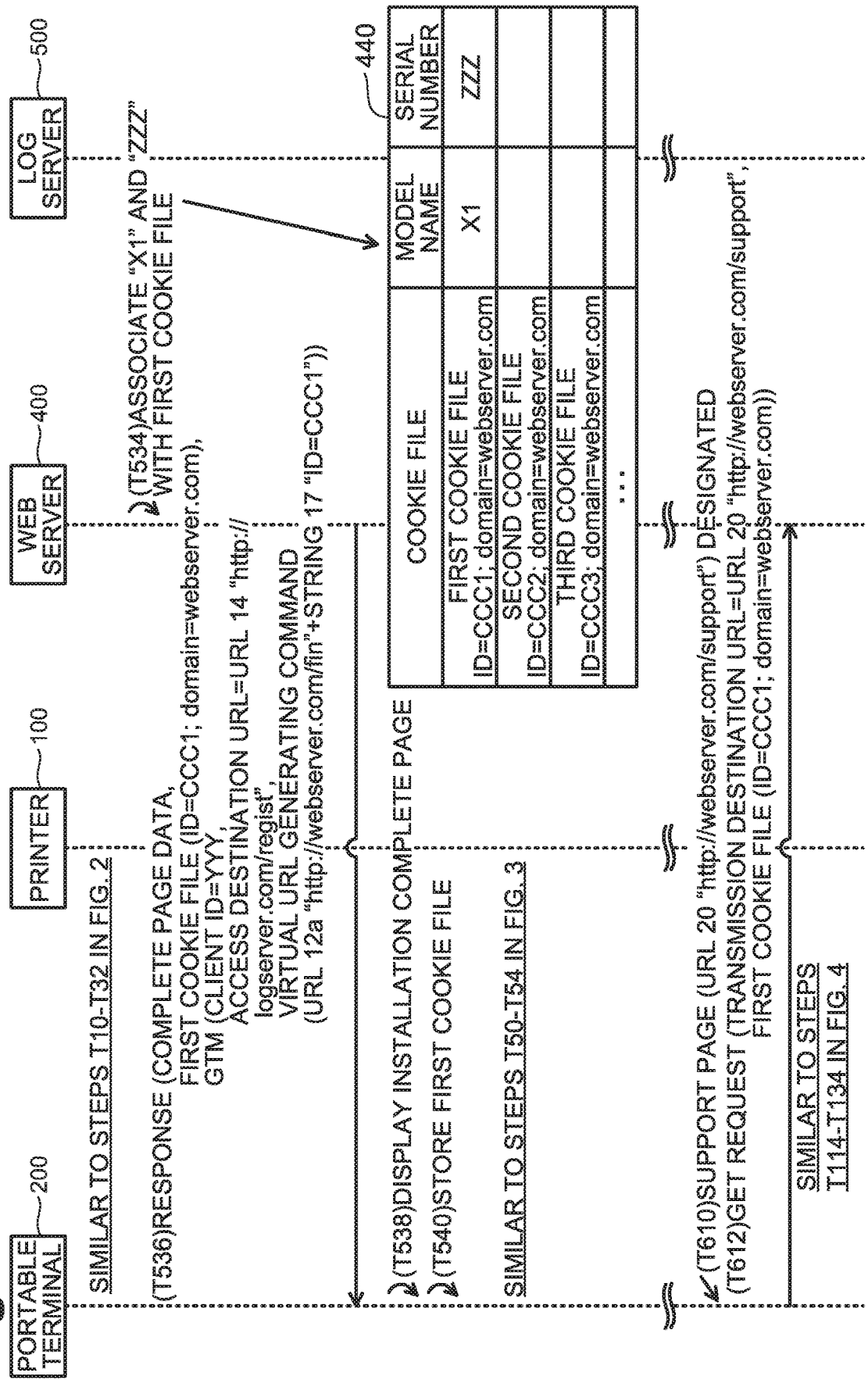

WEB SERVER

CROSS-REFERENCE TO RELATED APPLICATION

This application claims priority from Japanese Patent Application No. 2017-071975 filed on Mar. 31, 2017, the content of which is incorporated herein by reference in its entirety.

FIELD OF DISCLOSURE

The disclosure relates to a web server configured to transmit web page data to a terminal device.

BACKGROUND

A known network system includes a user terminal, a web site server, and an information storage server. In response to the user terminal accessing the web site server, the web site server transfers user terminal information to the information storage server. This configuration enables the information storage server to store information indicative of a history of an access of the user terminal to the web site server.

SUMMARY

One or more aspects of the disclosure provide a new technique that may enable effective use of URLs corresponding to web page data that were accessed.

One illustrative aspect of the disclosure may provide a communication system comprising: a first controller configured to perform: receiving, from a terminal device, target-related information relating to a target peripheral device, the target-related information including at least one of an identification information for identifying the target peripheral device and a model number information representing a model number of the target peripheral device; storing the target-related information into a location corresponding to a specific data; transmitting the specific data to the terminal device; receiving, from the terminal device, a first page request including a first Uniform Resource Locator (URL) and the specific data, the first URL being specified by an instruction inputted into the terminal device, the first URL corresponding to a first web page data in a web server; extracting, using the received specific data, the target-related information related to the target peripheral device; transmitting the first web page data corresponding to the first URL included in the first page request to the terminal device; and executing, after receiving the first page request, a specific process for storing the first URL included in the first page request and the extracted target-related information related to the target peripheral device in association with each other in a first memory.

According to the above-described configuration, the first URL corresponding to the first web page data accessed by the terminal device in accordance with a user instruction, and target related-information about the target peripheral device, may be recorded in association with each other, in the first memory. Accordingly, for example, the administrator of the web server may identify what web page data was accessed by the user of the target peripheral device using the terminal device. This may enable effective use of URLs corresponding to web page data that was accessed.

BRIEF DESCRIPTION OF THE DRAWINGS

FIG. 2 is a sequence diagram illustrating a sequence of steps to be executed in connection with activation of an installer in an illustrative embodiment according to one or more aspects of the disclosure.

FIG. 3 is a sequence diagram continuing from FIG. 2.

FIG. 4 is a sequence diagram illustrating a sequence of steps to be executed in connection with designation of a support page in an illustrative embodiment according to one or more aspects of the disclosure.

FIG. 5 is a sequence diagram illustrating a sequence of communication steps between a printer and a service server in an illustrative embodiment according to one or more aspects of the disclosure.

FIG. 6 is a sequence diagram illustrating a sequence of steps to be executed in connection with activation of an installer in a second illustrative embodiment according to one or more aspects of the disclosure.

FIG. 7 is a sequence diagram illustrating a sequence of steps to be executed in connection with designation of a support page in the second illustrative embodiment according to one or more aspects of the disclosure.

FIG. 8 is a sequence diagram illustrating a sequence of steps to be executed in a modification according to one or more aspects of the disclosure.

DETAILED DESCRIPTION

First Illustrative Embodiment

Figure 1:
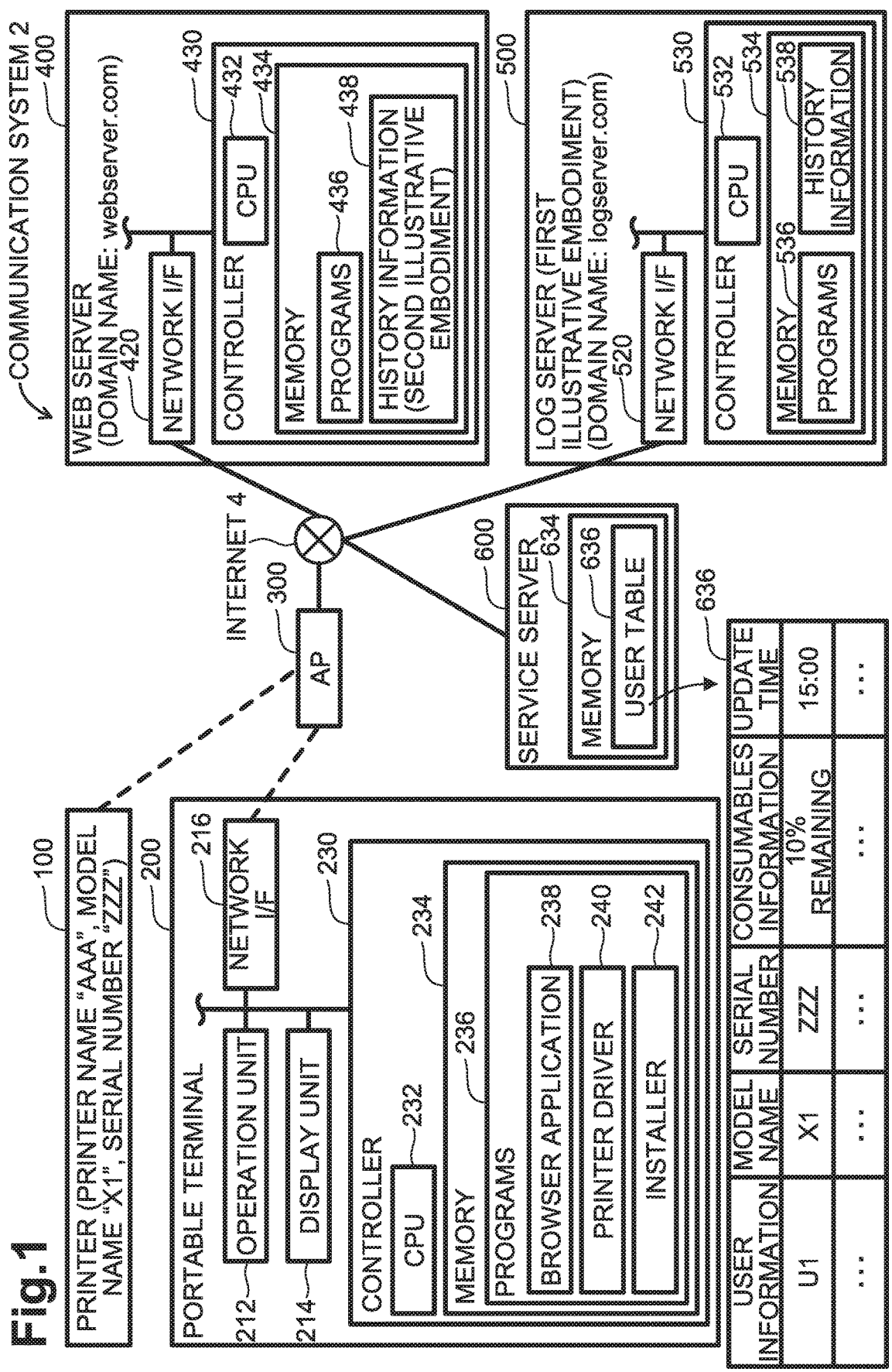
FIG. 1 is a diagram illustrating configuration of a communication system in an illustrative embodiment according to one or more aspects of the disclosure.

Configuration of Communication System 2; FIG. 1

As depicted in FIG. 1, a communication system 2 includes a printer 100, a portable terminal 200, a web server 400, a log server 500, and a service server 600. The printer 100 and the portable terminal 200 are connected to a wireless local area network ("LAN") formed by an access point ("AP") 300. The printer 100 and the portable terminal 200 are allowed to communicate with each other, via the AP 300. The AP 300 is connected to the Internet 4. This enables the printer 100 and the portable terminal 200 to access to the Internet 4, via the AP 300. In another embodiment, a wired LAN may be used for the wireless LAN. In another embodiment, the wireless LAN may be used by one of the printer 100 or the portable terminal 200, and the wired LAN may be used by the other. Each of the separate servers 400, 500, and 600 is located on the Internet 4.

Configuration of Printer 100

The printer 100 is a peripheral device of, for example, the portable terminal 200. The printer 100 is configured to execute a printing function. The printer 100 has a printer name "AAA", a model name "X1", and a serial number "ZZZ".

Configuration of Portable Terminal 200

The portable terminal 200 is a portable terminal device, such as a mobile telephone, a smartphone, a PDA, a notebook PC, a tablet PC, a portable music playback device, and a portable movie playback device. In another embodiment, a stationary terminal device may be used for the portable terminal 200. The portable terminal 200 includes an operation unit 212, a display unit 214, a network interface ("I/F") 216, and a controller 230.

The operation unit 212 includes a plurality of keys. A user may operate the operation unit 212 (e.g., activates the keys)

to input or provide various instructions to the portable terminal 200. The display unit 214 includes a display configured to display various information. The display unit 214 includes a touch panel display that functions as an operation unit. The operation unit 212 and the display unit 214 may be collectively referred to as "the terminal operation unit". The network I/F 216 establishes a wireless connection with the AP 300.

The controller 230 includes a CPU 232 and a memory 234. The CPU 232 is configured to execute various processing based on programs 236 stored in the memory 234. The memory 234 includes a ROM and a RAM. The programs 236 include a browser application 238, a printer driver 240, and an installer 242. The browser application 238 is a general-purpose web browser application. The browser application 238 includes, for example, Internet Explorer "IE" (registered trademark of Microsoft Corporation), Safari (registered trademark of Apple, Inc.), and Google Chrome (registered trademark of Google, Inc.). The printer driver 240 is a program for generating print data using image data of an image to be printed and supplying the print data to the printer 100. The installer 242 is a program for installing the printer driver 240 into the portable terminal 200. The printer driver 240 and the installer 242 may be installed into the portable terminal 200 from, for example, computer-readable recording medium shipped together with the printer 100, or from a server on the Internet 4.

Configuration of Web Server 400

The web server 400 is a server provided on the Internet 4 by a vendor of the printer 100 (hereinafter referred to as "the printer vendor"), supplying web page data representing web pages. "webserver.com" is an example of the domain name of the web server 400.

The web server 400 includes a network I/F 420 and a controller 430. The network I/F 420 is connected to the Internet 4. The controller 430 includes a CPU 432 and a memory 434. The CPU 432 is configured to execute various processing based on programs 436 stored in the memory 434. The memory 434 includes a ROM and a RAM. Although not depicted, the memory 434 stores web page data (e.g., data in HyperText Markup Language ("HTML") format, and image data) representing web pages. In response to a request from the browser application 238 of the portable terminal 200, the web server 400 supplies the web page data in the memory 434, to the portable terminal 200.

Configuration of Log Server 500

The log server 500 is a server for storing a history of accesses to web pages. The server may be provided on the Internet 4 by a business operator different from the printer vendor. In the illustrative embodiment, the log server 500 is provided by Google (registered trademark of Google, Inc.). In another embodiment, the log server 500 may be provided by other business operators (e.g., the printer vendor). "logserver.com" is an example of the domain name of the log server 500.

The log server 500 includes a network I/F 520 and a controller 530. The network I/F 520 is connected to the Internet 4. The controller 530 includes a CPU 532 and a memory 534. The CPU 532 is configured to execute various processing based on programs 536 stored in the memory 534. The memory 534 includes a ROM and a RAM. The memory 534 is configured to store history information 538 that indicates a history of accesses to web pages.

Configuration of Service Server 600

The service server 600 is a server provided by the printer vendor on the Internet 4, managing statuses of the printer 100 to provide services in association with the statuses.

The service server 600 includes a memory 634. The memory 634 includes a ROM and a RAM. The memory 634 stores a user table 636. The user table 636 includes user information, model names of printers, serial numbers of the printers, consumables information, and an update time, which are associated with each other. The user information includes information of a user of a printer, such as name, gender, age, and address. For example, the user of the printer 100 may log in to the service server 600 using the portable terminal 200 and may register user information "U1" into the user table 636. Between the service server 600 and the printer 100, the extensible messaging and presence protocol "XMPP" connection, which is an "always-on" connection, is established. For establishing the XMPP connection between the service server 600 and the printer 100, the printer 100 transmits the model name "X1" and the serial number "ZZZ" to the service server 600. These pieces of information are registered in the user table 636. The consumables information represents a remaining amount in a consumable item, such as an ink cartridge or a toner cartridge, installed in a printer. Using the XMPP connection, the service server 600 receives consumables information and an update time of the consumables information from the printer 100. The service server 600 records the received consumables information and its update time in the user table 636. The update time is a time at which consumables information representing a residual amount in the consumable item was updated in response to execution of the printing function of the printer 100.

Sequence of Steps to be Executed in Connection with Activation of Installer 242; FIG. 2

Referring to FIG. 2, processes or steps to be executed in connection with activation of the installer 242 are described below. Those processes may be executed by the CPUs 232, 432, and 532. Instead of stating that the CPUs 232, 432, and 532 execute the processes, the following disclosure states, for ease of understanding, that the devices (e.g., the portable terminal 200) execute the processes.

At step T10, a user operates the operation unit 212 of the portable terminal 200 to activate the installer 242. In this case (where the installer 242 has been activated), the portable terminal 200 broadcasts, at step T12, search signals via the wireless LAN, in accordance with the installer 242. The search signal is a signal for requesting each of one or more peripheral devices connected to the AP 300 to transmit a response signal including device information of the one or more peripheral devices (e.g., the printer name, the model name, and the serial number).

In response to receiving the search signal at step T12, the printer 100 transmits, at step T14, a response signal including device information of the printer 100 (e.g., the printer name "AAA", the model name "X1", and the serial number "ZZZ") to the portable terminal 200.

In response to receiving a response signal from each of the one or more peripheral devices including the printer 100 at step T14, the portable terminal 200 displays, at step T16, a selection screen SS in the display unit 214 in accordance with the installer 242. The selection screen SS includes a printer name and a model name of each of the one or more peripheral devices. At step T18, the user operates the operation unit 212 of the portable terminal 200 to select the printer name "AAA" of the printer 100 in the selection screen SS.

In response to the printer name "AAA" being selected, the portable terminal 200 installs, at step T20, the printer driver 240 in accordance with the installer 242. At this time, the portable terminal 200 associates the device information of the printer 100 selected at step T18, with the printer driver 240 in accordance with the installer 242.

Upon completion of the installation of the printer driver 240, the portable terminal 200 generates a uniform resource locator ("URL") 12 in accordance with the installer 242, and supplies (e.g., forwards) the URL 12 to the browser application 238, at step T22. A URL typically includes a scheme portion, an authority portion, a pass portion, and a query portion. In an example of "http://webserver.com/aaa/bbb?xxx", "http" corresponds to a scheme portion; "webserver.com" following marks (colon and double slash) ":" and "//" corresponds to an authority portion; "aaa/bbb" corresponds to a pass portion; and "xxx" following a mark (question mark) "?" corresponds to a query portion. Some URLs may not include query portions. The portable terminal 200 identifies a URL 12a (e.g., "http://webserver.com/fin") predetermined in the installer 242. The URL 12a includes a domain name of the web server 400 "webserver.com". The portable terminal 200 generates the URL 12 by adding a query string 12b to the URL 12a. The query string 12b includes the model name "X1" and the serial number "ZZZ" of the printer 100 selected at step T18 (e.g., "model=X1&serial=ZZZ"). Subsequently, the portable terminal 200 supplies the generated URL 12 to the browser application 238. In this case (where the URL 12 has been supplied to the browser application 238), the portable terminal 200 transmits, at step T30, a GET request including the URL 12 as a transmission destination URL, to the web server 400 in accordance with the browser application 238. The transmission destination URL represents a destination to which the GET request is to be transmitted.

In response to receiving the GET request at step T30, the web server 400 extracts, at step T32, strings in the URL 12, which is included in the GET request. The web server 400 extracts a string in the URL 12 preceding the mark "?" (e.g., scheme, authority and pass portions) as the URL 12a, and a string following the mark "?" (e.g., query portion) as the query string 12b. The web server 400 further extracts the model name "X1" and the serial number "ZZZ" of the printer 100 from the query string 12b. The web server 400 thus extracts the model name "X1" and the serial number "ZZZ" from the transmission destination URL 12. This may eliminate the need for extracting information, such as the model name "X1", from a particular portion of the GET request where information other than the URL 12 is written, allowing information, such as the model name "X1", to be readily extracted. In another embodiment, information, such as the model name "X1", may be written in the particular portion of the GET request. The web server 400 may extract the information from the particular portion.

At step T34, the web server 400 generates a cookie file using the extracted model name "X1" and the serial number "ZZZ". The cookie file includes a cookie name region in which a cookie name is written and a domain region in which domain information is written. The web server 400 writes "X1" and "ZZZ" in the cookie name region (e.g., "model&serial=X1&ZZZ"), and the domain name of the web server 400 in the domain region (e.g., "domain=webserver.com"). The cookie file, which includes the information of the printer 100 (e.g., the model name "X1" and the serial number "ZZZ"), is associated with the information of the printer 100.

At step T36, the web server 400 transmits, to the portable terminal 200, a response including complete page data corresponding to the URL 12a, the cookie file generated at step T34, and Google Tag Manager ("GTM") ("Google" is a registered trademark of Google, Inc.). The complete page data is HTML data representing an installation complete page, which indicates the printer driver 240 has been installed. The GTM is instructive information for causing the portable terminal 200 to access the log server 500. The GTM includes a client ID (e.g., "YYY"), an access destination URL (e.g., a URL 14 "http://logserver.com/regist"), and a virtual URL generating command. The access destination URL represents a destination to which the portable terminal 200 is to access. A client ID is a unique ID assigned to a respective vendor (e.g., client) who operates a server on the Internet 4. The client ID "YYY" may be assigned to a client, e.g., the printer vendor. The access destination URL 14 includes a domain name of the log server 500 (e.g., "logserver.com"). Use of the access destination URL 14 may enable the portable terminal 200 to access the log server 500. The virtual URL generating command is written in JavaScript (a registered trademark of Sun Microsystems, Inc.) that can be interpreted by the browser application 238 of the portable terminal 200. The virtual URL generating command is a command for causing the portable terminal 200 to generate a virtual URL. The virtual URL generating command includes the URL 12a (e.g., "http://webserver.com/fin") extracted at step T32, and a string 17 including the model name "X1" and the serial number "ZZZ" extracted at step T32 (e.g., "model=X1&serial=ZZZ").

In response to receiving the response from the web server 400 at step T36, the portable terminal 200 displays, at step T38 in FIG. 3, an installation complete page P1 in the display unit 214, in accordance with the browser application 238. The installation complete page P1 is represented by the complete page data included in the response. The page P1 thus notifies the user that the printer driver 240 has been installed. The installation complete page P1 includes a URL of a download page (e.g., "http://webserver.com/apps") for downloading various applications provided by the printer vendor. Although not shown, the user selection of the URL causes the portable terminal 200 to access the download page in accordance with the browser application 238.

At step T40, the portable terminal 200 stores, in the memory 234, the cookie file included in the response received at step T36 in FIG. 3, in accordance with the browser application 238. If a user provides an instruction to designate a URL including the string "webserver.com", which is the same string as written in the domain region of the cookie file, the portable terminal 200 transmits a GET request including the URL and the cookie file stored in the memory 234 to the web server 400.

At step T50, the portable terminal 200 executes the virtual URL generating command included in the response received at step T36 in FIG. 2, in accordance with the browser application 238. More specifically, the portable terminal 200 generates a virtual URL 18 (e.g., "http://webserver.com/fin?model=X1&serial=ZZZ"). The virtual URL 18 includes the URL 12a in the virtual URL generating command and a query string which is the string 17 in the virtual URL generating command. The portable terminal 200 extracts the client ID "YYY" and the access destination URL 14 from the GTM included in the response received at step T36 in FIG. 2. Subsequently, the portable terminal 200 transmits a GET request to the log server 500 in accordance with the browser application 238. The GET request includes the extracted URL 14 as a transmission destination URL, the extracted client ID "YYY", and the generated virtual URL 18. The virtual URL 18 is not a transmission destination URL but serves to notify the log server 500 of the string constituting the virtual URL 18.

In response to receiving the GET request at step T50, the log server 500 extracts, at step T52, information from the GET request. More specifically, the log server 500 extracts the client ID "YYY", a string of the virtual URL 18 preceding the mark "?" as the URL 12a, and a string of the virtual URL 18 following the mark "?" as the query string 17. The log server 500 further extracts the model name "X1" and the serial number "ZZZ" of the printer 100 from the query string 17.

At step T53, the log server 500 records, in the memory 534, the extracted pieces of information (e.g., the client ID "YYY", the URL 12a, the model name "X1", and the serial number "ZZZ"), and a receive time (e.g., "2017/3/30 16:00") in association with each other, as the history information 538. The receive time is a time at which the log server 500 has received a GET request from the portable terminal 200. The URL 12a accessed by the portable terminal 200 based on a user instruction is associated with the printer 100 (e.g., the model name "X1", the serial number "ZZZ") by the recording of the information in the memory 534 as the history information 583.

At step T54, the log server 500 transmits a response to the GET request received at step T50 to the portable terminal 200. The response does not include web page data. In other words, the GET request at step T50 is not a signal for requesting web page data but a signal for recording the pieces of information included in the GET request into the log server 500. Upon finishing step T54, processes to be executed in connection with the activation of the installer 242 end.

Sequence of Steps to be Executed in Connection with Designation of Support Page; FIG. 4

Referring to FIG. 4, processes or steps to be executed in connection with designation of a support page on the web server 400 are described below. The processes are executed subsequent to the processes in FIGS. 2 and 3. The support page is designated in the portable terminal 200. The support page provides solutions to errors that occur in the printer 100. The processes to be executed by the portable terminal 200 in FIG. 4 may be executed by the browser application 238 of the portable terminal 200. Therefore, the expression "by the browser application 238" is omitted when the processes are described.

If the printer 100 has an error, a user may activate the browser application 238 in the portable terminal 200. At step T110, the user operates the terminal operation unit to designate a URL 20 (e.g., "http://webserver.com/support") corresponding to the support page. In other words, the user provides an instruction to designate the URL 20 to the portable terminal 200. In this case (where the URL 20 has been designated), the portable terminal 200 refers to the stored cookie file (in step T40 in FIG. 3) and determines that the URL 20 includes the same domain name "webserver.com", as written in the domain region of the cookie file. Subsequently, at step T112, the portable terminal 200 transmits to the web server 400, a GET request including the URL 20, as a transmission destination URL, and the cookie file. Although not shown, if the user provides an instruction to designate a particular URL that does not include the domain name "webserver.com", to the portable terminal 200, the portable terminal 200 determines that the URL does not include the domain name "webserver.com" included in the cookie file. In this case, the portable terminal 200 transmits a GET request that includes the particular URL as a transmission destination URL but does not include the cookie file.

In response to receiving the GET request at step T112, the web server 400 determines that the GET request includes the cookie file. In this case, the web server 400 transmits, at step T114, a response including the support page data corresponding to the URL 20 and the GTM, to the portable terminal 200. In other words, the web server 400 determines that the portable terminal 200 has already stored the cookie file therein, and accordingly does not transmit the cookie file to the portable terminal 200, unlike step T36 in FIG. 2 in which the web server 400 transmits the cookie file to the portable terminal 200. The GTM in the response transmitted at step T114 is similar to that transmitted at step T36 in FIG. 2, and includes the client ID "YYY" assigned to the printer vendor, and the URL 14 including the domain name of the log server 500 "logserver.com" as an access destination URL. The GTM further includes a virtual URL generating command. The virtual URL generating command includes the URL 20, which is the transmission destination URL included in the GET request received at step T112, and the string 17 (e.g., "model=X1&serial=ZZZ"). The string 17 may be generated in the following manner. The web server 400 extracts the model name "X1" and the serial number "ZZZ" from the cookie file included in the GET request received at step T112 and generates the string 17 including the extracted "X1" and "ZZZ".

In response to receiving the response at step T114, the portable terminal 200 displays, at step T120, a support page P2 represented by the support page data in the display unit 214. The support page P2 includes a box or field for entering a content of an error that occurred in the printer 100. A user may input the content of an error using the operation unit 212 to obtain solutions to the error.

At step T130, the portable terminal 200 executes the virtual URL generating command included in the response received at step T114. More specifically, the portable terminal 200 generates a virtual URL 22 (e.g., "http://webserver.com/support?model=X1&serial=ZZZ"). The virtual URL 22 includes the URL 20 in the virtual URL generating command and a query string which is the string 17 in the virtual URL generating command. Step T130 is similar to step T50 in FIG. 3 except that the virtual URL 22 is used in step T130.

In response to receiving the GET request at step T130, the log server 500 extracts, at step T132, information from the GET, similar to step T52 in FIG. 3. In other words, the log server 500 extracts the client ID "YYY", the URL 20, the model name "X1", and the serial number "ZZZ".

At step T133, the log server 500 records, in the memory 534, the extracted pieces of information (e.g., the client ID "YYY", the URL 20, the model name "X1", and the serial number "ZZZ") and a receive time in association with each other, as the history information 538. The receive time is a time at which the log server 500 has received a GET request from the portable terminal 200. The URL 20 accessed by the portable terminal 200 in accordance with a user instruction is associated with the printer 100 by the recording of the information in the memory 534 as the history information 583. In another embodiment, the receive time may be a time when the log server 500 records the pieces of information in the memory 534. In still another embodiment, in response to receiving the GET request at step T112, the web server 400 may transmit, at step T114, a response including information representing the receive time of the GET request (hereinafter referred to as the "accessed time"), to the portable terminal 200. In response to receiving a GET request including the accessed time from the portable terminal 200 at step T130, the log server 500 may extract information including the accessed time, and record, at step T132, the accessed time in the memory 534 as a receive time. Step T134 is similar to step T54 in FIG. 3. Upon finishing step T134, processes to be executed in connection with the designation of the support page end.

Communication Between Printer 100 and Service Server 600; FIG. 5

Referring to FIG. 5, communication to be executed between the printer 100 and the service server 600 is described. As described above, the user information "U1," the model name "X1," and the serial number "ZZZ" are registered in the user table 636 of the service server 600 in association with each other (refer to FIG. 1). The XMPP connection is established between the printer 100 and the service server 600, which enables a request from the service server 600 to be transmitted to the printer 100.

At step T230, the service server 600 transmits a printer information request to the printer 100. For example, the printer information request may be repeatedly transmitted at a regular interval. In response to transmitting the printer information request, the service server 600 receives, at step T232, the printer information from the printer 100. The printer information includes the model name "X1," the serial number "ZZZ," consumables information (e.g., "10% remaining" as in FIG. 5), and an update time of the consumables information (e.g., "2017/3/30 15:00"). In this case, at step T234, the service server 600 records the consumables information "10% remaining" and the update time "2017/3/30 15:00," included in the printer information, in the user table 636, in association with the model name "X1" and the serial number "ZZZ". In another embodiment, for the update time, the service server 600 may record a time at which the service server 600 has received the printer information. In still another embodiment, for the update time, the service server 600 may record a time at which the service server 600 records consumables information.

Although not shown, the service server 600 may execute service for dispatching new or replacement consumables, as a residual amount represented in the received consumables information is less than or equal to a predetermined value (e.g., "20%"). For example, a name and address included in the user information"U1" may be used for the dispatching service. The service may allow a user to obtain a new replacement automatically as a residual amount in his/her consumable item of the printer 100 is reduced. In another embodiment, the service server 600 may receive information representing other statuses (e.g., the number of printed pages and presence or absence of error occurrences) from the printer 100, instead of consumables information. For example, if the service server 600 receives error information indicating, for example, an occurrence of a sheet jam, the printer vendor may analyze the history information 538 and the user table 636 to identify which web page was viewed when the printer 100 had the sheet jam error.

Effects of First Illustrative Embodiment

In the first illustrative embodiment, in responses to receiving, from the portable terminal 200, a GET request including the model name "X1" and the serial number "ZZZ" of the printer 100 (step T30 in FIG. 2), the web server 400 transmits a cookie file including the model name "X1" and the serial number "ZZZ" to the portable terminal 200 (step T36). In response to a user providing, to the portable terminal 200, an instruction for designating the URL 20 corresponding to the support page in the web server 400 (step T110 in FIG. 4), the web server 400 receives a GET request including the URL 20 and the cookie file, from the portable terminal 200 (step T112) and transmit a response including the support page data and the GTM, to the portable terminal 200 (step T114). The GTM is a command for causing the portable terminal 200 to transmit the URL 20, the model name "X1" and the serial number "ZZZ", to the log server 500, and causing the log server 500 to store the pieces of information in association with each other in the memory 534 of the log server 500 (step T130). Transmission of the pieces of information by the portable terminal 200 in accordance with the GTM may cause the URL 20, the model name "X1", and the serial number "ZZZ" to be recorded in association with each other as the history information 538. In other words, a history of an access to the URL 20, and the printer 100 may be associated with each other. Use of the history information 538 may enable the printer vendor to know the web page (e.g., the URL 20) accessed by the user, as well as the model name "X1" and the serial number "ZZZ". Such information will be useful to the printer vendor and may be used by the printer vendor, for example, as described below.

For example, knowing a web page accessed by the user of the printer 100, which has the model name "X1", the printer vendor may revise the web page to offer more contents relating to the model name "X1".

For example, use of information on a web page accessed by the user of the printer 100, which has the serial number "ZZZ", as well as the user information "U1" associated with the serial number "ZZZ" in the user table 636 of the service server 600 may allow the printer vendor to analyze the relationship between the web page and characteristics or attributes of the user, such as gender and age. As a result of the analysis, the printer vendor may revise the web page to suit users of different genders and/or ages.

For example, use of information on a web page accessed by the user of the printer 100, which has the serial number "ZZZ", as well as the consumables information associated with the serial number "ZZZ" in the user table 636 of the service server 600 may allow the printer vendor to analyze the relationship between the web page and the residual amount of the consumables. The printer vendor, for example, accesses to the log server 500 using a device (e.g., terminal device) of the printer vendor, and obtains the history information 538. The printer vendor also accesses the service server 600 using the device of the printer vendor, and obtains the user table 636. Then, the device of the printer vendor combines pieces of information recorded at the same time or approximate same time which are obtained from each of the history information 538 and the user table 636, and displays the combined information on the display unit of the device of the printer vendor. As a result of the analysis, for example, the printer vendor may revise the web page to enable users to readily purchase consumables. In another embodiment, as described above, for example, information representing the number of printed pages may be recorded in the user table 636 instead of the consumables information. This configuration may allow the printer vendor to identify the web page frequently accessed by users who print a relatively large number of pages. Further, in the illustrative embodiment, the receive time, which is the same time or approximate same time that the web server 400 has received a GET request at step T112 in FIG. 4, is recorded as the history information 538 of the log server 500, and the update time of the consumables information is recorded in the user table 636 of the service server 600. This may allow the printer vendor to identify a correspondence between the consumable level and which web page was viewed.

In the illustrative embodiment, to install the printer driver 240 for the printer 100, the portable terminal 200 receives information, such as the model name "X1" and the serial number "ZZZ", from the printer 100 (step T14 in FIG. 2). Upon installation of the printer driver 240, the portable terminal 200 transmits a GET request including the pieces of information, such as "X1", to the web server 400 (step T30). The portable terminal 200 receives a cookie file from the web server 400 (step T36 in FIG. 2) and stores the cookie file (step T40 in FIG. 3). The cookie file may thus be automatically stored in the portable terminal 200 in connection with the installation of the printer driver 240 in the portable terminal 20. This may eliminate a user's operation for storing the cookie file in the portable terminal 200.

Correspondence

The printer 100 is an example of a "target peripheral device". The portable terminal 200 is an example of a "terminal device". The service server 600 is an example of a "status management server". The device information (e.g., the printer name, the model name, and the serial number) of the printer 10 is an example of "target related-information". The serial number "ZZZ" of the printer 10 is an example of "identification information". The model name "X1" is an example of "model number information". The cookie file is an example of "specific data". The support page data is an example of "first web page data". The complete page data is an example of "second web page data". The URL 20 is an example of a "first URL". The URL 12a is an example of a "second URL". The URL 22 is an example of a "third URL". The URL 12a is an example of "location information". The GET request at step T112 in FIG. 4 is an example of a "first page request" and the GET request at step T30 in FIG. 2 is an example of a "second page request". The memory 534 of the log server 500 is an example of a "first memory". The domain "webserver.com" is an example of a "web server domain". The information "domain=webserver.com" in the cookie file is an example of "domain information". The consumables information is an example of "status information". The GTM is an example of a "transmission request". The receive time in the history information 538 is an example of "first time information". The update time in the user table 636 is an example of "second time information".

Second Illustrative Embodiment

Next, a second illustrative embodiment is described. The second illustrative embodiment does not include the log server 500. The memory 434 of the web server 400 may store history information 438.

Sequence of Steps to be Executed in Connection with Activation of Installer 242; FIG. 6

Referring to FIG. 6, processes or steps to be executed in connection with activation of the installer 242 in the second illustrative embodiment are described below. Steps T310-T332 are similar to steps T10-T32 in FIG. 2.

At step T333, the web server 400 records, in the memory 434, pieces of information extracted at step T332 (e.g., the URL 12a, the model name "X1", and the serial number "ZZZ"), and a receive time in association with each other, as the history information 438. The receive time is a time (e.g., the accessed time) at which the web server 400 has received a GET request from the portable terminal 200. In another embodiment, the receive time may be a time when the web server 400 records information in the memory 434. Step T334 is similar to step T34 in FIG. 2. Step T336 is similar to step T36 in FIG. 2 except for the GTM, which is not included in the response in step T336. Steps T338 and T340 are similar to steps T38 and T40 in FIG. 3, respectively.

Sequence of Steps to be Executed in Connection with Designation of Support Page; FIG. 7

Referring to FIG. 7, processes or steps to be executed in connection with designation of the support page on the web server 400 in the second illustrative embodiment are described below.

Steps T410 and T412 are similar to steps T110 and T112 in FIG. 4, respectively. At step T414, the web server 400 extracts the URL 20 from the GET request received at step T412, as well as the model name "X1" and the serial number "ZZZ" from the cookie file. Subsequently, at step T415, the web server 400 records, in the memory 434, the pieces of information extracted at step T414 (e.g., the URL 20, the model name "X1", and the serial number "ZZZ"), and the receive time in association with each other, as the history information 438.

Effects of Second Illustrative Embodiment

In the second illustrative embodiment, the URL 20, the model name "X1" and the serial number "ZZZ" may be recorded in association with each other in the web server 400, as the history information 438. In other words, in the second illustrative embodiment, a history of an access to the URL 20 and the printer 100 may be associated with each other. Use of the history information 438 may enable the printer vendor to know the web page (e.g., the URL 20) accessed by the user, as well as the model name "X1" and the serial number "ZZZ". The access history may thus be used effectively.

Correspondence

The GET request at T412 in FIG. 7 is an example of the "first page request" and the GET request at step T330 in FIG. 6 is an example of the "second page request". The memory 434 of the web server 400 is an example of the "first memory". The receive time in the history information 438 is an example of the "first time information".

While aspects are described in detail with reference to specific embodiments thereof, this is merely an example, and various changes, arrangements and modifications may be made therein without departing from the spirit and scope of the disclosure.

Modification 1

Referring to FIG. 8, a first modification is described. In this modification, the memory 434 of the web server 400 prestores a cookie table 440 including a plurality of cookie files. In this modification, the step T10 to T32 in FIG. 2 are executed in a similar manner. At step T534, the web server 400 records the model name "X1" and the serial number "ZZZ", which are extracted at step T32, in the cookie table 440 by associating those pieces of information with a first cookie file among the plurality of cookie files. At step T536, the web server 400 transmits, to the portable terminal 200, a response including the complete page data, the first cookie file, and the GTM. In other words, in response to receiving a GET request, the web server 400 does not generate a cookie file, but transmits, to the portable terminal 200, the prepared first cookie file that does not include the model name "X1" and the serial number "ZZZ". Step T538 is similar to step T38 in FIG. 3. Step T540 is similar to step T40 except that the first cookie file is stored in step T540. After that, the step T50 to TM in FIG. 3 are executed in a similar manner.

Step T610 is similar to step T110 in FIG. 4. In this case (where the URL 20 is designated in step T610), the portable terminal 200 transmits, at step T612, a GET request including the URL 20 and the first cookie file, to the web server 400. Subsequent steps are executed similarly to steps T114-T134 in FIG. 4. In this modification, at the step T114, the web server 400 specifies the character string "ID=CCC1" including the GET request received at the step T612. The web server 400 extracts the model name "X1" and the serial number "ZZZ" associated with the specified the character string "ID=CCC1" using the cookie table 440. The web server 400 transmits a response using the extracted model name "X1" and the serial number "ZZZ". In this modification, the processing of T34 may be omitted.

Modification 2

At step T36 in FIG. 2, the web server 400 may transmit, to the portable terminal 200, a response including the complete page data and the cookie file, but not including the GTM. In this case (or in this configuration), the portable terminal 200 does not execute step T50 in FIG. 3. Before or after transmitting the response including the complete page data and the cookie file but not including the GTM to the portable terminal 200, the web server 400 may transmit the client ID "YYY", the URL 12a, the model name "X1", and the serial number "ZZZ" to the log server 500. The log server 500 may record these pieces of information in the memory 534. Similarly, at step T114 in FIG. 4, the web server 400 may transmit, to the portable terminal 200, a response including the support page data but not including the GTM. In this case, the portable terminal 200 does not execute step T130 in FIG. 4. Before or after transmitting the response including the support page data but not including the GTM to the portable terminal 200, the web server 400 may transmit the client ID "YYY", the URL 20, the model name "X1", and the serial number "ZZZ", to the log server 500. The log server 500 may record these pieces of information in the memory 534.

Modification 3

In response to receiving the GET request at step T112 in FIG. 4, the web server 400 may record, in the memory 434, the cookie file in the GET request. At step T114, the web server 400 may transmit to the portable terminal 200 a virtual URL generating command that does not include the string 17 but includes file identification information (e.g., a file ID) which identifies the cookie file. In this case, at step T130, the portable terminal 200 may transmit, to the log server 500, a GET request including the client ID, the transmission destination URL 14, a portion of the virtual URL 22 (e.g., the URL 20) that does not include the query string 17, and the file identification information. The log server 500 may record the URL 20 and the file identification information in association with each other in the memory 534, as the history information 538. In other words, the model name "X1" and the serial number "ZZZ" included in the cookie file recorded in the memory 434 of the web server 400 are associated with the URL 20 recorded in the memory 534 of the log server 50, via the file identification information. This modification may also allow the printer vendor to know the web page (e.g., the URL 20) accessed by the user, as well as the model name "X1" and the serial number "ZZZ". The access history may thus be used effectively. In this modification, combination of the memory 434 of the web server 400 and the memory 534 of the log server 500 is an example of the "first memory".

Modification 4

At step T22 in FIG. 2, a GET request including one of the model name "X1" and the serial number "ZZZ" may be used. In this case, subsequent steps may use the one of the model name "X1" and the serial number "ZZZ". This modification may allow the printer vendor to know the web page accessed by the user, as well as the one of the model name "X1" and the serial number "ZZZ". Generally, the target related-information may include at least one of the identification information for identifying a target peripheral device, and the model number information of the target peripheral device.

Modification 5

The "target peripheral device" is not limited to the printer 100, but may be, for example, a scanner or a multi-functional device.

Modification 6

At step T36 in FIG. 2, the web server 400 may transmit a particular file, which is different from the cookie file, to the portable terminal 200. The particular file may not include the domain name "webserver.com" of the web server 400 but may include the model name "X1" and the serial number "ZZZ". When the browser application 238 of the portable terminal 200 accesses any web server on the Internet, the particular file may be transmitted from the portable terminal 200 to the web server. In this case (where the portable terminal 200 has transmitted the particular file), at step T112 in FIG. 4, the web server 400 may receive a GET request including the particular file from the portable terminal 200, and extracts the model name "X1" and the serial number "ZZZ" from the particular file. Subsequent steps are similar to those in the first illustrative embodiment. This modification may also enable the web page accessed by the user and the printer 100 to be associated with each other. In this modification, the particular file is an example of the "specific data", and the "specific data" does not include domain information.

Modification 7

The communication system 2 does not necessarily include the service server 600. In other words, the "status management server" may be eliminated.

Modification 8

At step T30 in FIG. 2, the portable terminal 200 may transmit, to the web server 400, a GET request that does not include the model name "X1" and the serial number "ZZZ" in connection with the installation of the printer driver 240. In this case, in connection with the installation of the printer driver 240, steps T32 and T34 are not executed, and at step T36, the cookie file and the GTM are not transmitted to the portable terminal 200. Thereafter, in response to receiving inputs of the model name "X1" and the serial number "ZZZ", for example, from a user, the portable terminal 200 transmits the model name "X1" and the serial number "ZZZ" to the web server 400. In this case (or in this configuration), processes similar to steps T32 and T34 are executed, and the cookie file and the GTM are transmitted to the portable terminal 200. Subsequent steps are similar to those in the first illustrative embodiment. In other words, in the processing of T30 in FIG. 2, target related-information received from the target peripheral device is not necessarily transmitted to the web server.

Modification 9

In the illustrative embodiments, each of the processes in FIGS. 2-8 is performed by the CPU 432 of the web server 400, the CPU 532 of the log server 500, the CPU 232 of the portable terminal 200, or a CPU (not depicted) of the service server 600, each of which executes programs (e.g., software). Alternatively, at least one of processes in FIGS. 2-8 may be executed by hardware, e.g., a logical circuit.

The technical elements described in the specification or the drawings can exhibit technical usefulness, either alone or in combination, and combinations are not limited to those described in the claims as filed. The techniques illustrated in the specification or the drawings can achieve a plurality of purposes at the same time, and achieving any of them has technical usefulness.

What is claimed is:

1. A communication system comprising:
 a first controller configured to perform:
  receiving, from a terminal device, target-related information relating to a target peripheral device, the target-related information including at least one of an identification information for identifying the target peripheral device or a model number information representing a model number of the target peripheral device;
  storing the target-related information into a location corresponding to a cookie file;
  transmitting the cookie file to the terminal device;
  receiving, from the terminal device, a first page request including a first Uniform Resource Locator (URL) and the cookie file, the cookie file including at least data corresponding to at least one of the identification information for identifying the target peripheral device or the model number information representing a model number of the target peripheral device, the first URL not including the data, the first URL being specified by an instruction inputted into the terminal device, the first URL corresponding to a first web page data in a web server;
  extracting, using the received cookie file, the target-related information related to the target peripheral device;
  transmitting the first web page data corresponding to the first URL included in the first page request to the terminal device; and
  executing, after receiving the first page request, a specific process for storing the first URL included in the first page request and the extracted target-related information related to the target peripheral device in association with each other in a first memory.

2. The communication system according to claim 1, wherein
 the communication system comprises the web server, the web server comprising the first controller.

3. The communication system according to claim 1, wherein storing the target-related information comprises:
 generating the cookie file; and
 storing the target-related information into the cookie file.

4. The communication system according to claim 1, wherein the first controller is further configured to perform:
 receiving, from the terminal device, a second page request before receiving the first page request, the second page request including a second URL corresponding to second web page data in the web server, but not including the cookie file; and
 transmitting, in response to receiving the second page request, second web page data and the cookie file to the terminal device,
 wherein the transmission of the first web page data is in response to receiving the first page request, and
 wherein the cookie file is not transmitted to the terminal device in response to receiving the first page request.

5. The communication system according to claim 4, wherein:
 the second page request includes a URL,
 the URL includes a first portion and a second portion,
 the first portion includes the second URL representing storing area of the second web page, and
 the second portion includes the target-related information described as a query.

6. The communication system according to claim 1, wherein
 the communication system further comprises a status management server being different from the web server, the status management server comprising:
 a second memory; and
 a second controller configured to perform:
  receiving, from the target peripheral device, the target-related information and status information representing a status of the target peripheral device; and
  storing the target-related information and the status information into the second memory in association with each other such that a correspondence between the first URL stored in the first memory and the status information of the target peripheral device stored in the second memory may be determined based on the target-related information.

7. The communication system according to claim 6, wherein:
 the specific process includes a process for storing, into the first memory, first time information relating to a time at which the first page request is received,
 the first URL, the target-related information and the first time information are stored in the first memory in association with each other,
 the second controller is further configured to perform storing, into the second memory, second time information representing a time at which the target peripheral device has the status represented by the status information, the second time information being stored in association with the target-related information and the status information stored in the second memory, such that the correspondence between the first URL stored in the first memory and the status information of the target peripheral device stored in the second memory may be determined based on the target-related information, the first time information and the second time information.

8. The communication system according to claim 1, wherein:
the communication system comprises the web server, the web server comprising the first controller and the first memory, and
the specific process comprises storing the first URL and the target-related information in association with each other in a data structure of the first memory of the web server.

9. The communication system according to claim 1, wherein:
the first memory is included in a log server being different from the web server, and
the specific process comprises transmitting the first URL and the extracted target-related information to the log server, the log server configured to store the first URL and the target-related information in association with each other in the first memory of the log server.

10. The communication system according to claim 1, wherein:
the first memory is included in a log server being different from the web server, and
the specific process comprises transmitting, after receiving the first page request, a transmission request to the terminal device, the transmission request being configured to cause the terminal device to transmit the first URL and the extracted target-related information to the log server, the log server configured to store the first URL and the target-related information in association with each other in the first memory of the log server.

11. The communication system according to claim 10, wherein:
the transmission request is configured to cause the terminal device to generate a second URL and to cause the terminal device to transmit the second URL to the log server,
the second URL includes a first portion and a second portion,
the first portion includes a character string representing the first URL, and
the second portion includes the target-related information described as a query.

12. The communication system according to claim 1, wherein:
the communication system further comprises the terminal device, the terminal device comprising:
an operation unit;
a display unit; and
a third controller configured to perform:
transmitting the target-related information to the web server;
receiving the cookie file from the web server;
receiving, through the operation unit, the instruction for specifying the first URL corresponding to the first web page data in the web server;
transmitting, in response to receiving the instruction, the first page request including the first URL and the cookie file to the web server;
receiving the first web page data from the web server; and
causing the display unit to display a first web page using the first web page data.

13. The communication system according to the claim 12, wherein the third controller is further configured to perform:
receiving the target-related information from the target peripheral device,
wherein transmitting the target-related information comprises transmitting the received target-related information to the web server.

14. The communication system according to claim 13, wherein the third controller acquires, from at least one peripheral device, related-information relating to the at least one peripheral device, one of the at least one peripheral device being the target peripheral device, wherein the third controller is further configured to perform:
causing the display unit to display a selection screen for selecting a peripheral device from the at least one peripheral device; and
receiving, by the operation unit, a selection of the target peripheral device from the at least one peripheral device,
wherein transmitting the target-related information transmits, to the web server, the target-related information relating to the target peripheral device selected by the operation unit.

15. The communication system according to claim 1, wherein
the target-related information received from the terminal device is information of the target peripheral device selected for use by a user of the terminal device.

16. The communication system according to claim 1, wherein
storing the target-related information comprises storing the target-related information into the cookie file.

17. The communication system according to claim 1, wherein
storing the target-related information comprises storing the target-related information into a data structure in association with the cookie file.

18. A non-transitory computer readable storage medium storing instructions,
the instructions, when executed by a processor of a communication system, causing the communication system to perform:
receiving, from a terminal device, target-related information relating to a target peripheral device, the target-related information including at least one of an identification information for identifying the target peripheral device and a model number information representing a model number of the target peripheral device;
storing the target-related information into a location corresponding to a cookie file;
transmitting the cookie file to the terminal device;
receiving, from the terminal device, a first page request including a first Uniform Resource Locator (URL) and the cookie file, the cookie file including at least data corresponding to at least one of the identification information for identifying the target peripheral device or the model number information representing a model number of the target peripheral device, the first URL not including the data, the first URL being specified by an instruction inputted into the terminal device, the first URL corresponding to a first web page data in a web server;

extracting, using the received cookie file, the target-related information related to the target peripheral device;

transmitting the first web page data corresponding to the first URL included in the first page request to the terminal device; and executing, after receiving the first page request, a specific process for storing the first URL included in the first page request and the extracted target-related information related to the target peripheral device in association with each other in a memory.

19. The non-transitory computer readable medium according to claim 18, wherein storing the target-related information comprises storing the target related information into the cookie file.

20. The non-transitory computer readable medium according to claim 18, wherein storing the target-related information comprises storing the target-related information into a data structure in association with the cookie file.

21. A communication method comprising:

receiving, from a terminal device, target-related information relating to a target peripheral device, the target-related information including at least one of an identification information for identifying the target peripheral device and a model number information representing a model number of the target peripheral device;

storing the target-related information into a location corresponding to a cookie file;

transmitting the cookie file to the terminal device;

receiving, from the terminal device, a first page request including a first Uniform Resource Locator (URL) and the cookie file, the cookie file including at least data corresponding to at least one of the identification information for identifying the target peripheral device or the model number information representing a model number of the target peripheral device, the first URL not including the data, the first URL being specified by an instruction inputted into the terminal device, the first URL corresponding to a first web page data in a web server;

extracting, using the received cookie file, the target-related information related to the target peripheral device;

transmitting the first web page data corresponding to the first URL included in the first page request to the terminal device; and executing, after receiving the first page request, a specific process for storing the first URL included in the first page request and the extracted target-related information related to the target peripheral device in association with each other in a memory.

* * * * *